(12) United States Patent
Hur et al.

(10) Patent No.: US 7,084,583 B2
(45) Date of Patent: Aug. 1, 2006

(54) EXTERNAL ELECTRODE FLUORESCENT LAMP, BACK LIGHT UNIT USING THE EXTERNAL ELECTRODE FLUORESCENT LAMP, LCD BACK LIGHT EQUIPMENT USING THE BACK LIGHT UNIT AND DRIVING DEVICE THEREOF

(75) Inventors: Jeong-Wook Hur, Seoul (KR);
Jong-Lee Park, SeongNam (KR);
Hwan-Woong Lee, Seoul (KR);
Sung-Kyoo Lim, YongIn (KR)

(73) Assignee: Mirae Corporation, Chungcheongnam-Do (KR)

( * ) Notice: Subject to any disclaimer, the term of this patent is extended or adjusted under 35 U.S.C. 154(b) by 93 days.

(21) Appl. No.: 10/481,110

(22) PCT Filed: Jun. 25, 2001

(86) PCT No.: PCT/KR02/01213

§ 371 (c)(1),
(2), (4) Date: Jul. 8, 2004

(87) PCT Pub. No.: WO03/001550

PCT Pub. Date: Jan. 3, 2003

(65) Prior Publication Data

US 2004/0232853 A1    Nov. 25, 2004

(30) Foreign Application Priority Data

| Jun. 25, 2001 | (KR) | ................ 2001-36259 |
| Oct. 22, 2001 | (KR) | ................ 2001-65041 |
| Nov. 6, 2001 | (KR) | ................ 2001-68928 |

(51) Int. Cl.
*H05B 37/02* (2006.01)
*G05F 1/00* (2006.01)

(52) U.S. Cl. ................ 315/291; 315/209 R; 315/219; 315/246; 349/58

(58) Field of Classification Search ................ 315/291, 315/246, 219, 276, 209 R, 278; 349/58
See application file for complete search history.

(56) References Cited

U.S. PATENT DOCUMENTS

| 5,420,481 A | * | 5/1995 | McCanney ................ 315/291 |
| 6,278,226 B1 | * | 8/2001 | Danov et al. ................ 310/359 |
| 6,417,833 B1 | | 7/2002 | Takemoto |
| 6,674,250 B1 | * | 1/2004 | Cho et al. ................ 315/291 |

FOREIGN PATENT DOCUMENTS

| JP | 2000-352718 A2 | 12/2000 |
| KR | 2001-0004689 A | 1/2001 |
| KR | A 2001-0044259 A | 6/2001 |

\* cited by examiner

*Primary Examiner*—Wilson Lee
*Assistant Examiner*—Chuc Tran
(74) *Attorney, Agent, or Firm*—The Webb Law Firm

(57) ABSTRACT

The present invention relates to an external electrode fluorescent lamp which can provide higher degree of and more improved uniformity of brightness than those of conventional ones, and to a LCD back light unit using the external electrode fluorescent lamp. The present invention also relates to an equipment and a driving device to adapt the LCD back light unit. The external electrode fluorescent lamp of the present invention is comprising: an upper panel of lamp which is serpentine shaped; a lower panel which is planar shaped and to be combined with the upper panel to make channels between the upper panel and the low panel; and external electrodes which are located at the two extreme sides at the surface of the upper panel.

4 Claims, 16 Drawing Sheets

EXTERNAL ELECTRODE FLUORESCENT LAMP, BACK LIGHT UNIT USING THE EXTERNAL ELECTRODE FLUORESCENT LAMP, LCD BACK LIGHT EQUIPMENT USING THE BACK LIGHT UNIT AND DRIVING DEVICE THEREOF

BACKGROUND OF THE INVENTION

1. Field of the Invention

The present invention relates generally to an external electrode fluorescent lamp, a liquid crystal display backlight unit using the same, and a device for driving the external electrode fluorescent lamp, and more particularly to a liquid crystal display backlight unit using an external electrode fluorescent lamp, which can easily produce a surface light source with higher brightness and brightness uniformity than a conventional edge-type or a direct-type backlight unit, reduce a calorific value of a liquid crystal display panel due to electrodes of a fluorescent lamp, prevent breakdown of a fluorescent lamp caused by breakdown of electrodes, and extend the life of a fluorescent lamp, and further particularly, to an external electrode fluorescent lamp, liquid crystal display backlight unit using the same and device for driving an external electrode surface emission fluorescent lamp, which can simplify the manufacturing process and improve the productivity thereof, and which can be easily applied to a large-scale backlight unit.

2. Description of Related Art

Generally, a liquid crystal display (LCD) used as display means for characters, graphics and moving pictures has been greatly highlighted as a next generation display device for mobile phones or televisions because it causes less fatigue of eyes than a conventional cathode ray tube (CRT) display device, and it can realize miniaturization, light weight, and low power consumption.

The construction of a conventional LCD panel in which characters or images are displayed on LCD is described in brief. First, if liquid crystal material is injected between a pair of surface-processed transparent glass plates, and an electrical signal (voltage) is supplied to the injected liquid crystal material using an LCD driving circuit (not shown) for generating a driving signal, phase variation of the liquid crystal material occurs by the electrical signal. The LCD driving circuit applies different voltages to the liquid crystal material to vary distribution of the liquid crystal material, thus enabling specific characters or images to be displayed.

However, since an LCD panel on which characters are displayed cannot emit light for itself, a means for assisting in visually recognizing contents (characters or logos) displayed on the panel is required. Currently, a backlight system using lamps which irradiate light from the sides or the back of a LCD panel is generally used as the assisting means.

Conventional backlight systems are mainly classified into edge-type backlight units and direct-type backlight units according to positions of fluorescent lamps projecting light. The edge-type backlight units employ a manner in which light sources are positioned beneath both sides of the panel, such that light inputted from the light sources forms a surface light source by a light guide plate and a reflective sheet and the surface light source illuminates cells of the LCD panel. Such an edge-type backlight unit is advantageous in that, since it indirectly guides light radiated from the light sources, brightness uniformity is high. However, it is problematic in that brightness decreases relative to the brightness uniformity.

FIG. 1 shows an embodiment of a conventional edge-type backlight unit. Referring to FIG. 1, a lamp cover for covering fluorescent lamps, the fluorescent lamps for radiating light by the supply of power, a reflective sheet for reflecting the radiated light in a predetermined direction, a light guide plate for guiding the radiated light, a diffusion sheet for uniformly radiating incident light to prisms, a vertical prism, a horizontal prism, and a protective sheet are layered in order from the bottom. In the above-described edge-type backlight unit, since the fluorescent lamps are positioned at the side of the light guide plate, brightness uniformity increases, while brightness decreases.

Further, the direct-type backlight units employ a manner in which light sources (cold cathode fluorescent lamps) are arranged beneath an LCD panel, a diffusion sheet is arranged on the front of the light sources, and a reflective sheet is arranged on the back of the light sources, such that light radiated from the light sources is reflected and diffused to be irradiated onto cells of the LCD panel. Since such a direct-type backlight unit effectively uses light using the reflective sheet and the diffusion sheet, it can obtain high brightness, so it is suitable for backlight units requiring high brightness. However, the direct-type backlight unit is problematic in that it cannot provide sufficient brightness according to the size of LCD panels which become large, and brightness uniformity is also decreased.

Moreover, the conventional direct-type backlight unit requires as many inverters as the number of fluorescent lamps used as light sources. That is, characteristics of respective fluorescent lamps used as the light sources are slightly different. Therefore, in the case where the fluorescent lamps are connected in parallel with each other, there occurs a problem that a plurality of fluorescent lamps are not simultaneously turned on due to the difference in discharge properties, if one inverter having a high power supplying capability is mainly used. That is, some of fluorescent lamps may be turned on, and the remaining fluorescent lamps may be turned on late or turned off. In order to solve the problem, inverters are respectively connected to fluorescent lamps to drive the fluorescent lamps. However, there are problems, such as high power consumption, cost increase due to the increased number of inverters, and productivity decrease due to the increased assembly time, degradation of LCD due to heat generated by electrodes, etc.

Further, a prior art, plate-type surface emission fluorescent lamp applied by the present applicant, improves brightness uniformity and brightness of conventional light sources (fluorescent lamps) for backlighting. FIG. 12 is a plan view of a previously applied surface emission fluorescent lamp. As shown in FIG. 12, an upper sheet of the lamp is constructed such that serpentine-shaped channels into which discharge gas is injected and which are isolated from the outside are arranged to be adjacent to each other. Further, bent portions are mutually connected, such that a single channel is formed in the upper sheet. At both ends of the single channel, internal electrodes 201 are installed.

FIG. 13 is a sectional view by A—A line of the surface emission fluorescent lamp 203 of FIG. 12, and shows sections of channels 203a formed adjacent to each other. Actually, the channels 203a shown to be separated respectively are mutually connected to each other to form a single path. In FIG. 13, although the section "A" is depicted by a semicircle, the shape of the channels 203 can be varied to a rectangle, a diamond, etc.

Further, FIG. 14 is a sectional view by B—B line of FIG. 12, and shows the installation of the internal electrodes 201 of the surface emission fluorescent lamp 203. As shown in FIG. 14, one end of each of the internal electrodes 201 is inserted into the surface emission fluorescent lamp 203. Therefore, many manufacturing processes are added to insert and fix the internal electrodes 201.

As described above, the previously applied surface emission fluorescent lamp 203 uniformly radiates light over the entire surface area, thus supplementing the disadvantages of the conventional edge-type and direct-type backlight units to provide high brightness and high brightness uniformity. Especially, since the surface emission fluorescent lamp 203 has serpentine-shaped channels, the brightness and the brightness uniformity are remarkably improved. Further, the shape of the surface emission fluorescent lamp 203 can be changed to "L", "W", etc. In this case, the upper sheet of the lamp is typically formed in the shape of "L" or "W", and the lower sheet thereof is formed in the shape of a plate, such that the upper and lower sheets are manufactured to be combined with each other, or to be integrated.

However, as the construction of the fluorescent lamp is varied as described above, there are inconveniences in that installation positions of the internal electrodes 201 for supplying power to the fluorescent lamp are frequently varied, so manufacturing equipment must be changed. Moreover, the internal electrodes 201 are fixedly inserted into the surface emission fluorescent lamp 203, thus causing several problems, such as increase of the manufacturing process of the fluorescent lamp and the deterioration of productivity due to breakdown of internal electrodes, etc. Further, the surface emission fluorescent lamp is problematic in that, if a plurality of fluorescent lamps are connected in parallel to apply the fluorescent lamps to a large-scale backlight unit, wiring is complicated to connect inverters to respective electrodes, so the volume of the backlight unit increases.

SUMMARY OF THE INVENTION

Accordingly, the present invention has been made keeping in mind the above problems occurring in the prior art. The present invention is an LCD backlight unit using an external electrode fluorescent lamp, which can easily produce surface light sources, reduce a calorific value of an LCD panel caused by electrodes, prevent breakdown of the external electrode fluorescent lamp due to the breakdown of electrodes, and extend the life of the external electrode fluorescent lamp.

The present invention is also an LCD backlight unit using an external electrode fluorescent lamp, which can simplify the manufacture of a backlight unit, and improve driving characteristics of a fluorescent lamp by changing a power supplying manner for a fluorescent lamp used in a conventional direct-type backlight unit.

The present invention is also an LCD backlight unit using an external electrode fluorescent lamp, in which a backlight unit is produced as a module, thus greatly reducing time required for assembly, and consequently improving productivity.

The present invention is also an external electrode surface emission fluorescent lamp for LCDs and backlight unit using the same, in which electrodes of a surface emission fluorescent lamp used for LCD backlighting are constructed as external electrodes, thus simplifying the manufacturing process of the surface emission fluorescent lamp, improving productivity, enabling a large-scale backlight unit to be easily produced, and enabling produced LCD panels to be miniaturized and thinned.

The present invention is also an external electrode surface emission fluorescent lamp for LCDs and backlight unit using the same, which has a getter housing for supplying mercury to the inside of channels of the surface emission fluorescent lamp and absorbing several impurities.

The present invention is also a device for driving a surface emission fluorescent lamp for LCDs, which applies an initial lighting voltage for generating charged particles to a surface emission fluorescent lamp for LCDs having main electrodes and auxiliary electrodes, and applies a lighting maintaining voltage to the surface emission fluorescent lamp before generated charged particles disappear, thus maintaining a lit condition of the surface emission fluorescent lamp.

The present invention is also a device for driving a surface emission fluorescent lamp for LCDs, which can operate stably even at a low voltage and reduce continuous stress of a transformer and losses of switching devices due to a high voltage during initial lighting, and which controls a surface emission fluorescent lamp having main electrodes and auxiliary electrodes.

More specifically, the present invention is an LCD backlight unit for radiating light used to read characters displayed on an LCD panel from below, comprising an inverter for generating first and second voltages using a direct current (DC) voltage and supplying the first and second voltages through first and second output lines, respectively; a plurality of external electrode fluorescent lamps each having a first end electrode connected to one of the first and second output lines for supplying the first and second voltages received from the inverter, and a second end electrode arranged opposite to the first end electrode and connected to the ground, the external electrode fluorescent lamps being sequentially arranged on the same plane; and a base for accommodating the external electrode fluorescent lamps by allowing the sequentially arranged external electrode fluorescent lamps to be fixed.

Further, the present invention is an external electrode surface emission fluorescent lamp for LCD backlighting, comprising a serpentine-shaped upper sheet having a section for maximizing brightness uniformity within a predetermined distance from its surface; a plate-shaped lower sheet combined with the upper sheet to form mutually connected channels; and main electrodes and auxiliary electrodes installed on surfaces of both ends of the upper sheet.

Further, the present invention is an external electrode surface emission fluorescent lamp having the construction in which channels mutually adjacent to each other are isolated to prevent discharge gas from passing through the channels, and a plurality of gas paths, whose thickness, installation position and number are variable, are installed between adjacent channels.

Further, the present invention is a device for driving an external electrode surface emission fluorescent lamp for LCDs having main electrodes and auxiliary electrodes, the driving device supplying power to the external electrode surface emission fluorescent lamp, comprising a main controller for lighting the surface emission fluorescent lamp in response to a control signal from an LCD controller, a priming circuit for supplying power to the auxiliary electrodes for a predetermined period of time so as to generate initial charged particles in the external electrode surface emission fluorescent lamp in response to the control signal from the main controller; and a lighting maintaining circuit for supplying power to the main electrodes so as to apply a lighting maintaining voltage using the charged particles generated by the priming circuit.

Lastly, the present invention is a driving device further comprising a feedback circuit for detecting a current flowing into the surface emission fluorescent lamp, converting the current into a voltage and outputting the voltage to the main controller, thus enabling an input voltage for brightness control to be controlled through the lighting maintaining circuit.

DETAILED DESCRIPTION OF THE INVENTION

Figure 1:
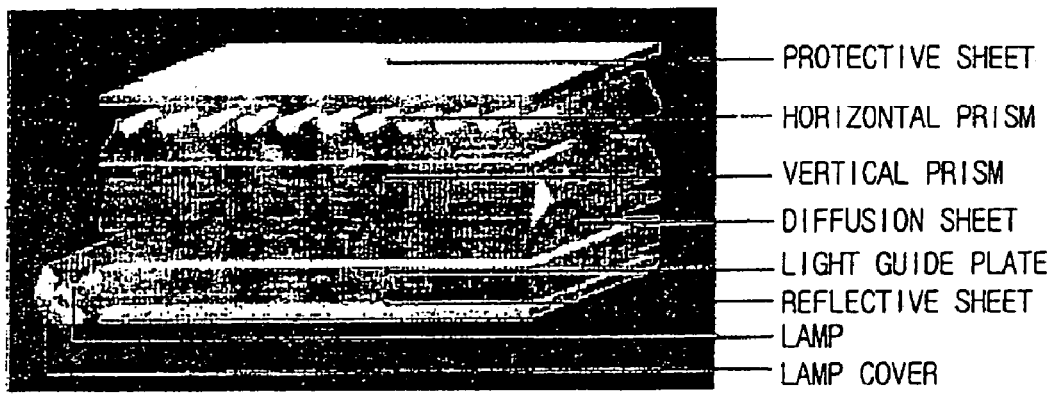
FIG. 1 is a perspective view of a conventional edge-type backlight unit.
Figure 2:
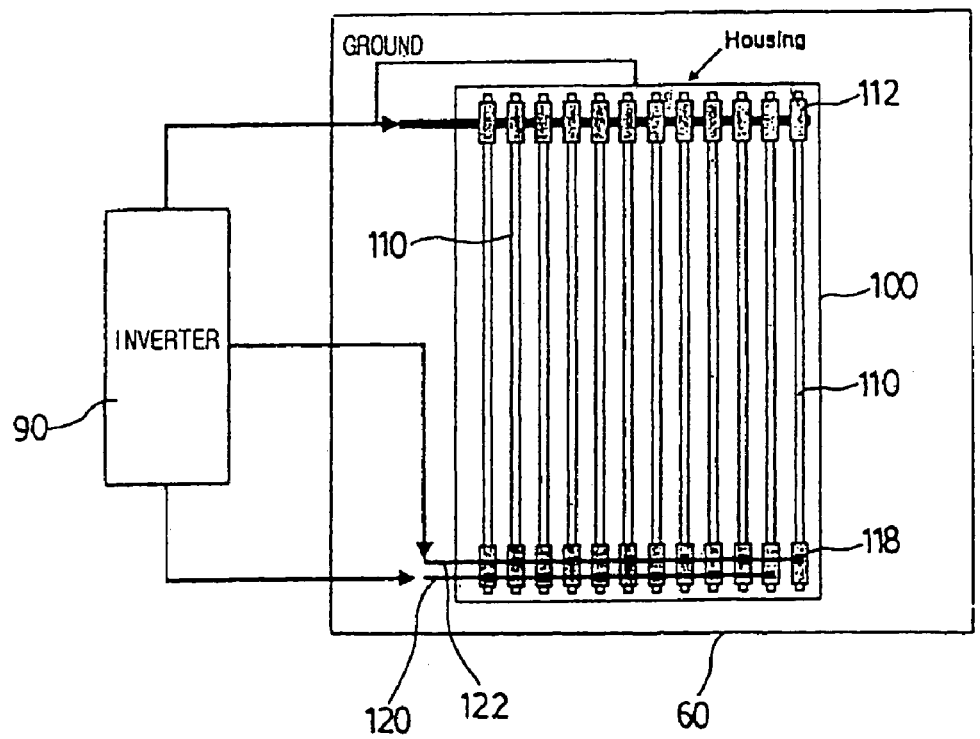
FIG. 2 is a view showing the wiring of a backlight unit according to the present invention.

FIG. 2 is a view showing the wiring of a backlight unit according to the present invention. The backlight unit of the present invention comprises an inverter 90 and a base 100. The inverter 90, which is used to supply lighting voltages to a plurality of external electrode fluorescent lamps, 110, generates first and second voltages and supplies the first and second voltages to the external electrode fluorescent lamps 110 through first and second output lines 120 and 122. The base 100 includes the plurality of fluorescent lamps 110 lit by receiving the first and second voltages from the inverter 90.

The fluorescent lamps 10 are external electrode fluorescent lamps having external electrodes, not internal electrodes formed at both ends of a fluorescent lamp like a conventional fluorescent lamp. Even though the external electrodes are not indicated by a specific reference numeral in FIG. 2, they are formed to be protruded from both ends of each of the fluorescent lamps 110, wherein, a contact point 118 is formed on any one of the both-end external electrodes of each of the fluorescent lamps 110.

The external electrode fluorescent lamps 110 are divided into two parts by odd and even orders, such that they are supplied with lighting voltages through the first output line 120 or the second output line 122 connected to the inverter 90. Referring to FIG. 2, the voltages supplied to the fluorescent lamps 110 are supplied through the contact points 118 connected to the first or second output line 120 or 122 every other lamp. The contact points 118 are electrically connected to the electrodes formed on end portions of the fluorescent lamps 110 by soldering, which will be described later. Therefore, the fluorescent lamps 110 on which the contact points 118 coming into contact with the output lines are formed are supplied with power through corresponding output lines.

In this way, stable supply of power can be achieved by supplying voltages using the first and second output lines. An electrode 112 of the other end of each of the fluorescent lamps 110, which is not supplied with power, is connected to the ground. Connection manners for the first and second output lines 120 and 122, which can be considered as another characteristics of the present invention, will be described later.

Figure 3:
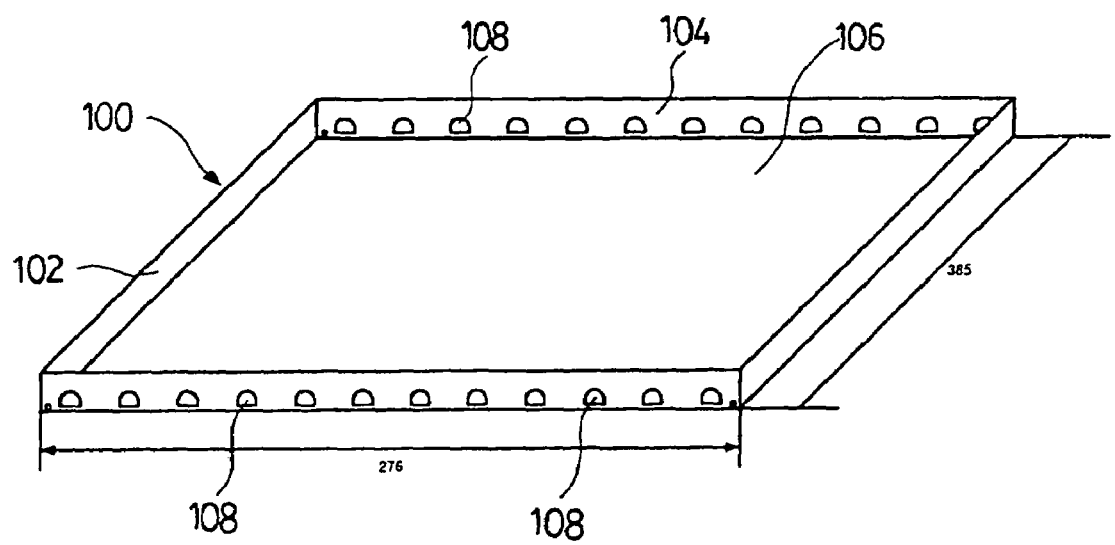
FIG. 3 is a perspective view of a base unit according to the present invention.

Referring to FIG. 3, the base 100 for accommodating the external electrode fluorescent lamps 110 is formed in the shape of an open rectangular box in which a pair of isolation plates 102 longitudinally extended and arranged opposite to each other, and a pair of lamp fixing plates 104 having both ends connected to the isolation plates 102 and being opposite to each other, are constructed to form four sides of a rectangle, and a reflective sheet 106 is further installed on the bottom.

Even though not shown in FIG. 3, after the external electrode fluorescent lamps 110 are horizontally arranged, a diffusion sheet is arranged over the fluorescent lamps 110, thus enabling the base 100 to be produced in the form of a full rectangular box. Further, terminals for connecting the first and second output lines 120 and 122 are formed on the side of the base 100. In this way, if the base 100 is produced as a box-shaped module, the assembly of the backlight unit can be promptly accomplished.

On the pair of lamp fixing plates 104, a plurality of lamp fixing holes 108 are oppositely formed at regular intervals. The lamp fixing holes 108 are used to fix the external electrode fluorescent lamps 110 in a line. The lamp fixing holes 108 allow the external electrode fluorescent lamps 110 to be fixed thereto using rubber holders.

The reflective sheet 106 reflects light radiated from the external electrode fluorescent lamps 110 arranged thereon. A reflective sheet with a coating-processed surface and with high reflection efficiency can be used as the reflective sheet 106.

Figure 4:
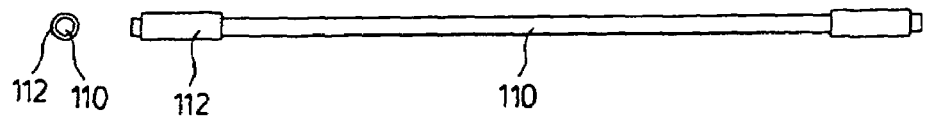
FIGS. 4 to 6 are side views of a fluorescent lamp into which electrodes and rubber holders are inserted.
Figure 5:
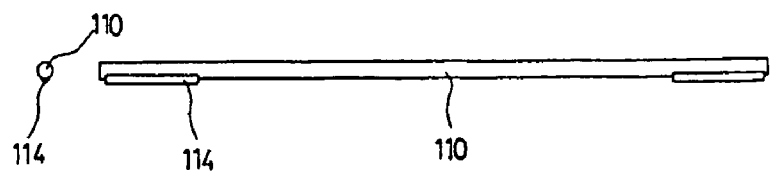

FIGS. 4 and 5 show the electrodes 112 formed on circumferences of both ends of the external electrode fluorescent lamp 110. The electrodes 112 serve to supply a high voltage to the fluorescent lamp 110 so as to sufficiently excite the fluorescent lamp 110 when high voltage pulses are applied to the fluorescent lamp 110 from the outside. The electrodes 112 are produced using materials with excellent conductivity, for example, copper, aluminum tape, etc.

Further, the electrodes can be formed such that they fully enclose the circumferences of both ends of the external electrode fluorescent lamp 110, as shown in the electrodes 112 of FIG. 4, or they partially enclose upper portions or lower portions of circumferences of both ends thereof, as shown in electrodes 114 of FIG. 5. The advantage of the former is in that, since the areas of the electrodes 112 are wide, sufficient exciting power can be provided to sufficiently light the external electrode fluorescent lamp 110 when high voltage pulses are applied. On the other hand, the latter has an advantage in that, since electrodes 114 partially cover the surface of the external electrode fluorescent lamp 110, a large amount of light is radiated, thus improving light radiating efficiency of fluorescent lamps.

In left sides of FIGS. 4 and 5, side views of the external, electrode fluorescent lamp 110 are simply depicted. Referring to FIG. 4, it can be seen that the electrodes 112 are formed to fully enclose circumferences of both ends of the external electrode fluorescent lamp 110. Further, referring to FIG. 5, it can be seen that the electrodes 114 are partially formed on only lower circumferences (or upper circumferences) of both ends of the external electrode fluorescent lamp 110. Applications of the electrodes 112 and 114 will be described later.

Figure 6:
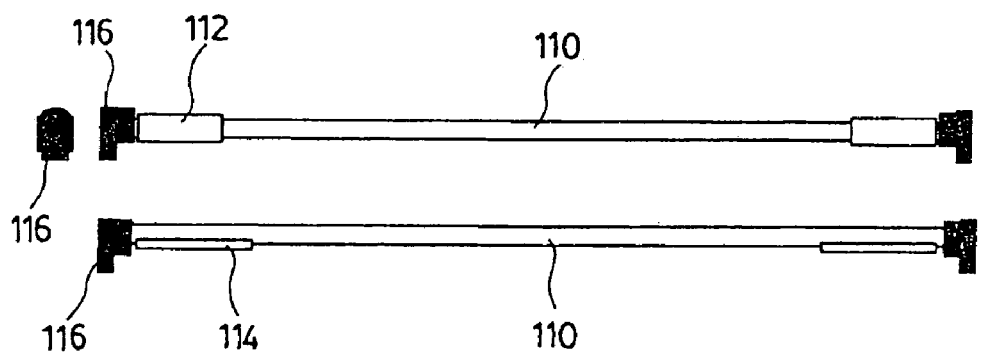

FIG. 6 shows the coupling of rubber holders 116 for allowing the external electrode fluorescent lamps 110 to be fixed to the lamp fixing holes 108 formed in the base 100. The rubber holders 116 are interlocked with both ends of the external electrode fluorescent lamp 110, and are each comprised of two parts having different diameters. In a first part having a smaller diameter, a hole for accommodating an end of the external electrode fluorescent lamp 110 is formed. A second part having a larger diameter is adhered closely and fixed to the border surface of each of the lamp fixing holes 108. A left side of FIG. 6 shows a side view of the rubber holder 116. As described above, the present invention is advantageous in that it employs the external electrode fluorescent lamps 110, thus enabling the fluorescent lamps to be easily installed.

Figure 7:
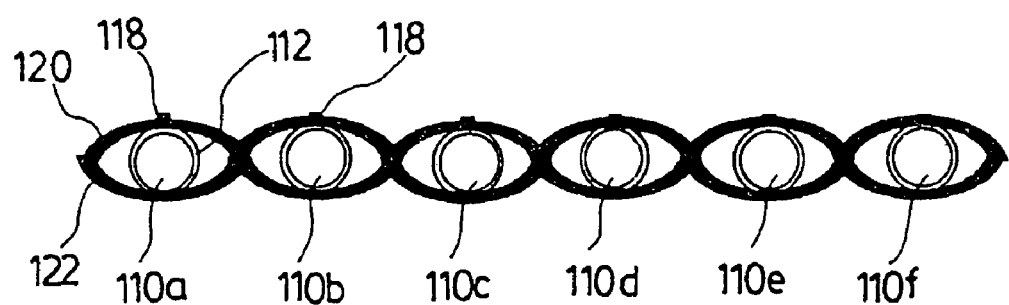
FIGS. 7 and 8 are views showing the connection of output lines for supplying power to the fluorescent lamp.
Figure 8:
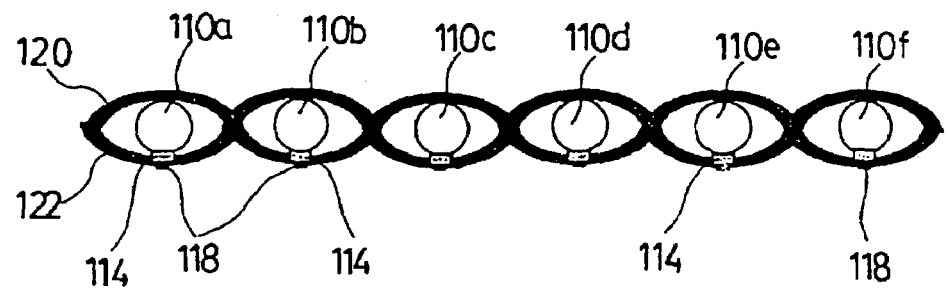

FIGS. 7 and 8 are views respectively showing the connections of the first and second output lines 120 and 122 for supplying, power to the external electrode fluorescent lamps 110.

FIG. 7 shows the positions of the contact points 118 and the wiring (of first and second output lines) if each of the electrodes 112 circularly encloses the circumference of the external electrode fluorescent lamp 110. Both the first and second output lines 120 and 122 are coated with covering material, so they are insulated. Therefore, only parts coming into contact with the contact points 118 are exposed to transmit electricity.

The first output line 120 passes over an external electrode fluorescent lamp 110a which is located first from the left side, and is connected with the electrode 112 through the contact point 118. After being connected with the electrode 112, the first output line 120 passes under an external electrode fluorescent lamp 110b, which is located second from the left side, without any electrical connection. Further, the first output line 120 is connected with the contact point 118 on an external electrode fluorescent lamp 110c, which is located third from the left side. That is, it can be seen that the first output line 120 is electrically alternately connected to external electrode fluorescent lamps 110a, 110c and 110e which are positioned in odd order. The contact points 118 are electrically connected to both the first and second output lines 120 and 122 by soldering.

Contact points can be directly formed by soldering or can be formed in the shape of a ring on the surface of the electrode. That is, ring-shaped contact points are formed, the first output line (or the second output line) is inserted into the contact points, and the contact points are then electrically connected to the first or second output line by soldering, thus simplifying the assembly of the backlight unit.

On the other hand, the second output line 122 passes under the first external electrode fluorescent lamp 110a (in the opposite direction of the first output line 120), and is connected to the contact point 118 on the second external electrode fluorescent lamp 110b. The second output line 122 connected to the contact point 118 passes under the third external electrode fluorescent lamp 110c and extended to the top of the next fluorescent lamp. That is, it can be seen that the second output line 122 is alternately connected to the external electrode fluorescent lamps 110b, 110d and 110f, which are positioned in even order. Therefore, if power is supplied to both the first and second output lines 120 and 122, the first output line 120 supplies power to the external electrode fluorescent lamps 110a, 110c, and 110e), and the second output line 122 supplies power to the external electrode fluorescent lamps 110b, 110d and 110f.

Further, the external electrode fluorescent lamps 110a to 110f are wired to the first and second output lines 120 and 122 while being enclosed by the first and second output lines 120 and 122. Especially, it is preferable to adhere the first and second output lines 120 and 122 to the surfaces of the fluorescent lamps, through which the output lines 120 and 122 pass, as closely as possible. Due to this wiring construction, a sufficient electric field is generated when high voltage pulses are applied from the inverter 90. Due to the sufficient electric field, lighting operations of external electrode fluorescent lamps can be indirectly improved.

FIG. 8 shows the wiring mariner fundamentally similar to that of FIG. 7, wherein the wiring manner of FIG. 8 is different from that of FIG. 7 in positions where contact points 118 of the first and second output lines 120 and 122 are formed. In this case, the contact points 118 are always formed on the lower surfaces of electrodes. In FIG. 8, even though the contact points 118 are different from those of FIG. 7, it is clear that the contact points 118 can be applied to any of circular electrodes or partially formed electrodes.

Further, the wiring of the first and second output lines 120 and 122 is achieved such that the output lines 120 and 122 are adhered closely to the external electrode fluorescent lamps to enclose them, as shown in FIG. 8. Therefore, a sufficient electric field is generated when high voltage pulses are applied from the inverter. Due to the sufficient electric field, lighting operations of external electrode fluorescent lamps can be indirectly improved.

Further, in the wiring of the output lines of the present invention, the positions of the contact points 118 are not limited by embodiments shown in the drawings. On the other hand, it is clear that the contact points are formed and soldered at convenient positions to connect the external electrode fluorescent lamps with the first and second output lines 120 and 122.

Figure 9:
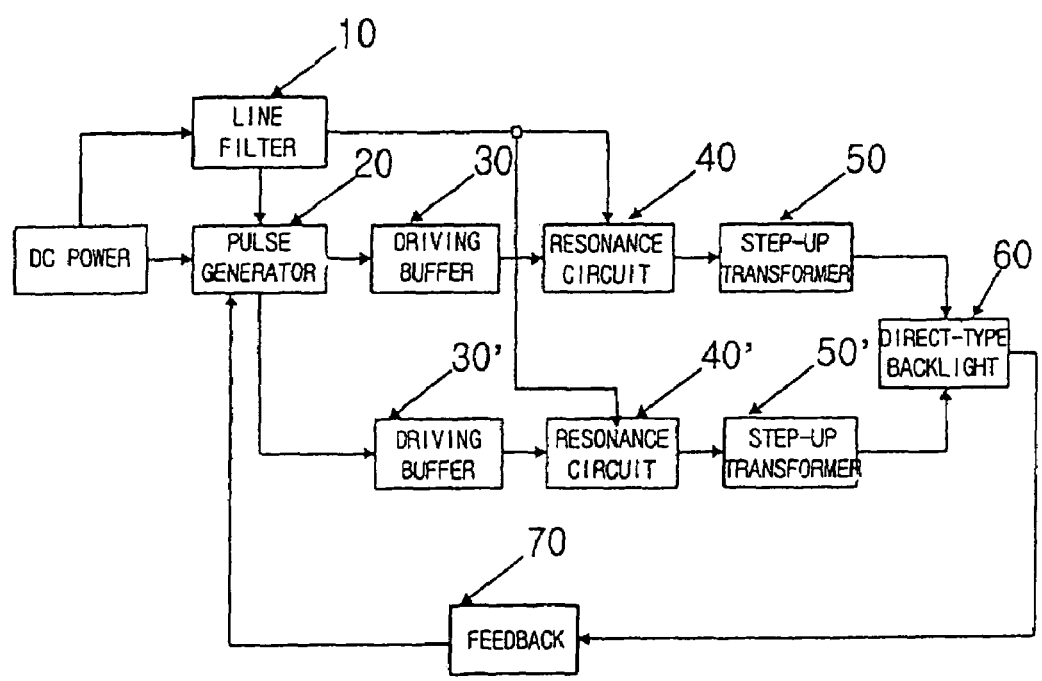
FIG. 9 is a block diagram of an inverter for supplying power to the fluorescent lamp.
Figure 10:
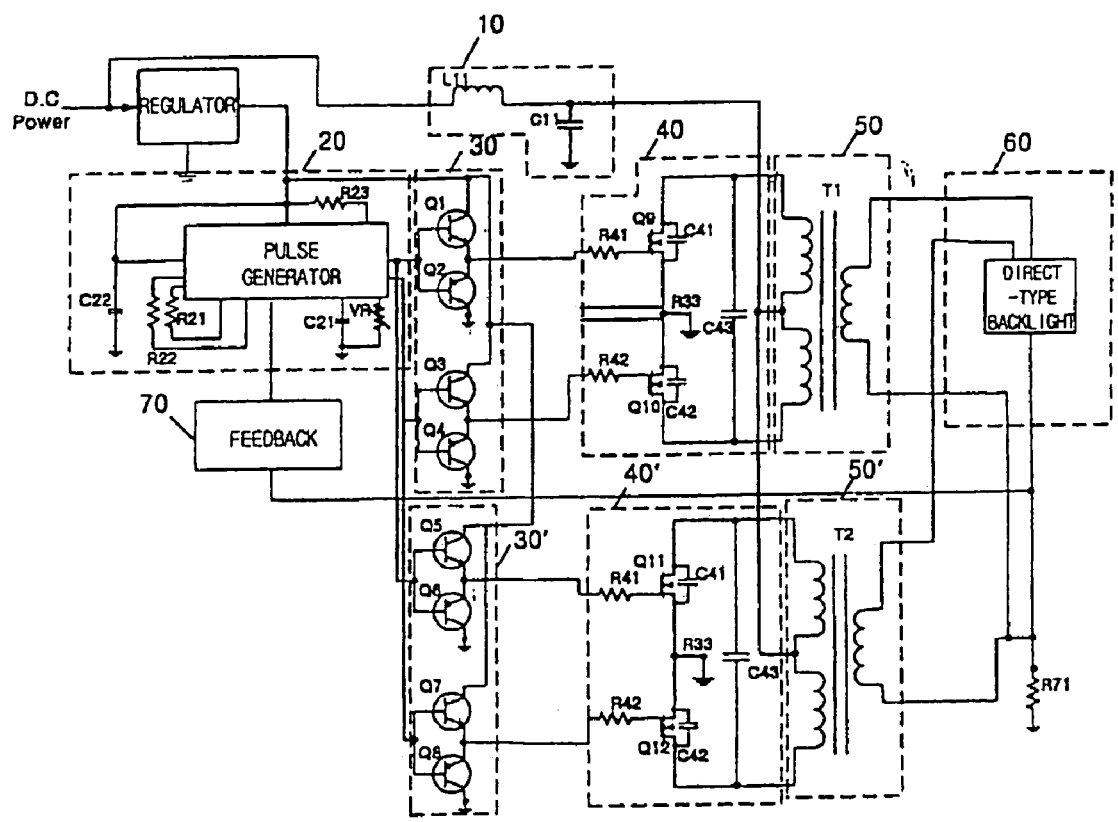
FIG. 10 is a detailed circuit diagram of the inverter of FIG. 9.

A block diagram of the inverter 90 for supplying power to the plural external electrode fluorescent lamps 110 having the above construction is depicted in FIG. 9, and a detailed circuit diagram of the inverter 90 of FIG. 9 is depicted in FIG. 10. The inverter 90 is described in detail with reference to FIGS. 9 and 10.

The inverter 90 comprises a line filter 10, a pulse generator 20, a pair of driving buffers 30 and 30', a pair of resonance circuits 40 and 40', a pair of step-up transformers 50 and 50', and a feedback circuit 70. The line filter 10 rectifies a direct current (DC) voltage supplied by a DC power unit, and outputs the rectified DC voltage. The pulse generator 20 generates switching driving pulses. The driving buffers 30 and 30' selectively output driving pulses generated by the pulse generator 20 to the resonance circuits 40 and 40'. The resonance circuits 40 and 40', which are driven by the driving pulses outputted from the driving buffers 30 and 30', convert the DC voltage received from the line filter 10 into an alternating current (AC) voltage and output the AC voltage. The step-up transformers 50 and 50' amplify each of the AC voltages outputted from the resonance circuits 40 and 40', respectively, and output the amplified AC voltage to the external electrode fluorescent lamps 110 which are divided into two groups. The feedback circuit 70 detects a secondary voltage used to control brightness of the external electrode fluorescent lamps 110. High voltages outputted from the transformers 50 and 50' of the inverter 90 are synchronized and operated at the same phase and same frequency, thus enabling the external electrode fluorescent lamps 110 to be synchronously driven. By the synchronous driving of the two transformers, the fluorescent lamps 110 of the present invention can obtain more stable and improved operation characteristics compared with a case where a single transformer is used.

The operations of the inverter 90 are described in detail.

The line filter 10 receives DC power from the DC power unit (rectifying unit, battery or rechargeable battery), and rectifies the DC power to supply a stable current. Referring to FIG. 10, the line filter 10 consists of a coil L11 and a condenser C11, and serves to rectify and output a DC voltage supplied by the DC power unit. The DC voltage outputted from the line filter 10 is inputted to a center tap of each of the step-up transformers 50 and 50'. However, the DC voltage is controlled by the resonance circuits 40 and 40' to be modulated and outputted as an AC voltage.

The pulse generator 20, which is used to generate switching driving pulses, transmit the driving pulses to the driving buffers 30 and 30', respectively. Further, the pulse generator 20 controls voltage values supplied to the fluorescent lamps by varying the widths of the generated pulses in response to a signal received from the feedback circuit 70. The pulse generator 20 supplies a DC voltage for performing a stable operation using a regulator. Referring to FIG. 10 the pulse generator 20 outputs two pulse signals.

The driving buffers 30 and 30' output the driving pulses generated by the pulse generator 20 to the resonance circuits 40 and 40'. As shown in FIG. 10, the driving buffers 30 and 30' are comprised of NPN transistors Q1 and Q3 and PNP transistors Q2 and Q4, and NPN transistors Q5 and Q7 and PNP transistors Q6 and Q8, respectively. One pulse outputted from the pulse generator 20 is inputted to a base of each of the transistors Q1 and Q2 of the driving buffer 30. The other pulse outputted from the pulse generator 20 is inputted to a base of each of the transistors Q3 and Q4. These operations are applied to the driving buffer 30' in the same manner as the driving buffer 30. Therefore, driving points are varied according to waveform of pulses outputted from the pulse generator 20.

The resonance circuits 40 and 40' each convert the DC voltage received from the line filter 10 into a voltage signal of a predetermined frequency and output the voltage signal, in response to the switching pulse signals outputted from the driving buffers 30 and 30'. By the switching driving pulses of the pulse generator 20 and operations of the resonance circuits 40 and 40', AC voltage pulses of predetermined frequency are generated.

The outputted AC voltages are inputted to the step-up transformers 50 and 50', respectively, and sufficiently boosted. The boosted voltages are supplied to the external electrode fluorescent lamps 110. The voltages supplied to the external electrode fluorescent lamps 110 are high voltage signals having the, same frequencies and the same phases, as described above, and are used to drive the external electrode fluorescent lamps 110. The voltages outputted from the step-up transformers 50 and 50' are respectively supplied to the external electrode fluorescent lamps 110 through the first and second output lines 120 and 122 shown in FIG. 2. Since the output voltages have the same phases and frequencies, there is no difficulty in operating the fluorescent lamps 110 even though any one of the output lines 120 and 122 is connected to each of the two voltages.

The feedback circuit 70 detects a current flowing into the external electrode fluorescent lamps 110 in a secondary side as a voltage using a resistor R71, and outputs a control signal so as to vary brightness of the external electrode fluorescent lamps 110 on the basis of the voltage. The widths of the driving pulses generated by the pulse generator 20 are varied due to the signal received from the feedback circuit 70, thus optimizing the brightness of the external electrode fluorescent lamps 110.

Figure 11:
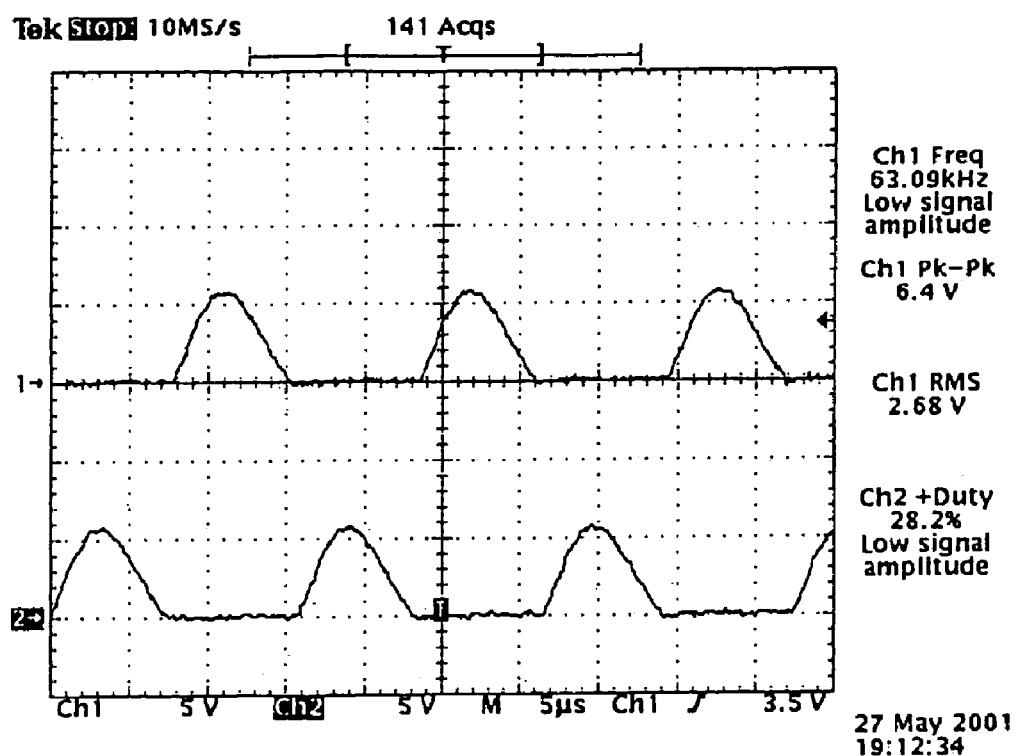
FIG. 11 is a waveform diagram showing driving pulses used by the inverter.

FIG. 11 is a waveform diagram showing the driving pulse signals of the inverter 90 of the present invention, and shows the pulse signals ch1 and ch2 generated by the pulse generator 20. As shown in FIG. 11, the driving pulse signals inputted to the driving buffers 30 and 30' have the same frequencies in different phases. The resonance circuits 40 and 40' are operated by the driving pulse signals to generate AC voltages.

An external electrode surface emission fluorescent lamp capable of substituting for the above-described bar-shaped external electrode fluorescent lamp and a backlight unit using the same are described later. The construction of such an external electrode surface emission fluorescent lamp is an improved structure of the surface emission fluorescent lamp previously applied by the present applicant. Due to this structure, a plurality of bar-shaped fluorescent lamps can be replaced with a single external electrode surface-emission fluorescent lamp.

That is, if an LCD panel is constructed as a large-scale panel, the external electrode surface emission fluorescent lamp as described later can be substituted for the bar-shaped external electrode fluorescent lamps, so a display area can be increased.

Figure 15:
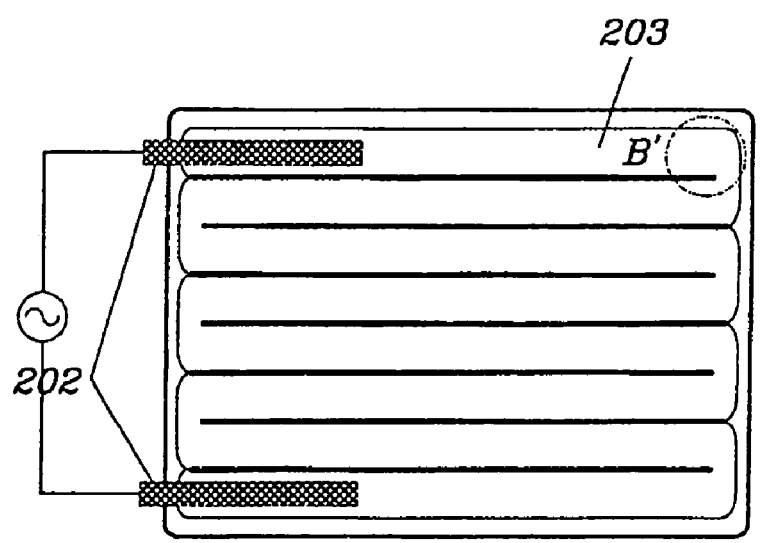
FIG. 15 is a plan view of an external electrode surface emission fluorescent lamp according to a preferred embodiment of the present invention.

FIG. 15 is a plan view of the above-described surface emission external electrode fluorescent lamp 203. As shown in FIG. 15, it can be seen that bar-shaped external electrodes 202 are formed at both ends of the surface emission fluorescent lamp 203 which is serpentine-shaped and is constructed as a single channel. The external electrodes 202 are simply implemented by attaching conduction materials for enabling electricity to easily pass therethrough to both ends of the lamp 203. Especially, since energy must be provided to the inside of the external electrode surface emission fluorescent lamp 203 through external surfaces of the electrodes 202, the electrodes 202 have sufficiently wide surface areas so as to provide sufficient excitation energy.

Figure 14:
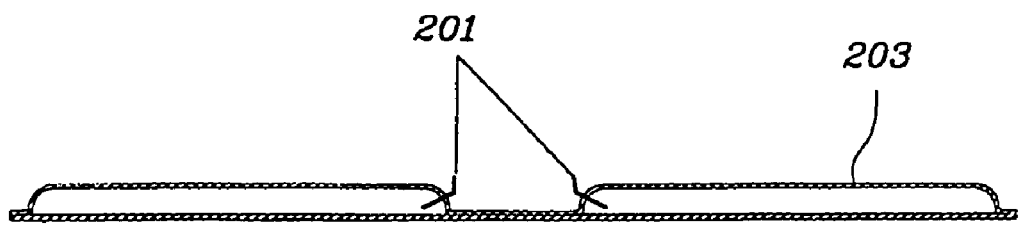
FIG. 14 is a sectional view by B—B line of FIG. 12.

The external electrodes 202 serve to supply a high voltage to the surface emission fluorescent lamp 203 so as to sufficiently excite the surface emission fluorescent lamp 203 when high voltage pulses are applied to the fluorescent lamp 203 from the outside. The external electrodes 202 are produced using materials with excellent conductivity, for example, copper, aluminum tape, etc. In this case, the conduction materials are not inserted into the surface emission fluorescent lamp 203 like the internal electrodes 201 of FIG. 14, but brought into contact with the surface of the fluorescent lamp 203 and fixed not to be separated from the fluorescent lamp 203 during the operation of the fluorescent lamp 203, thus completing the attachment of the materials.

Figure 12:
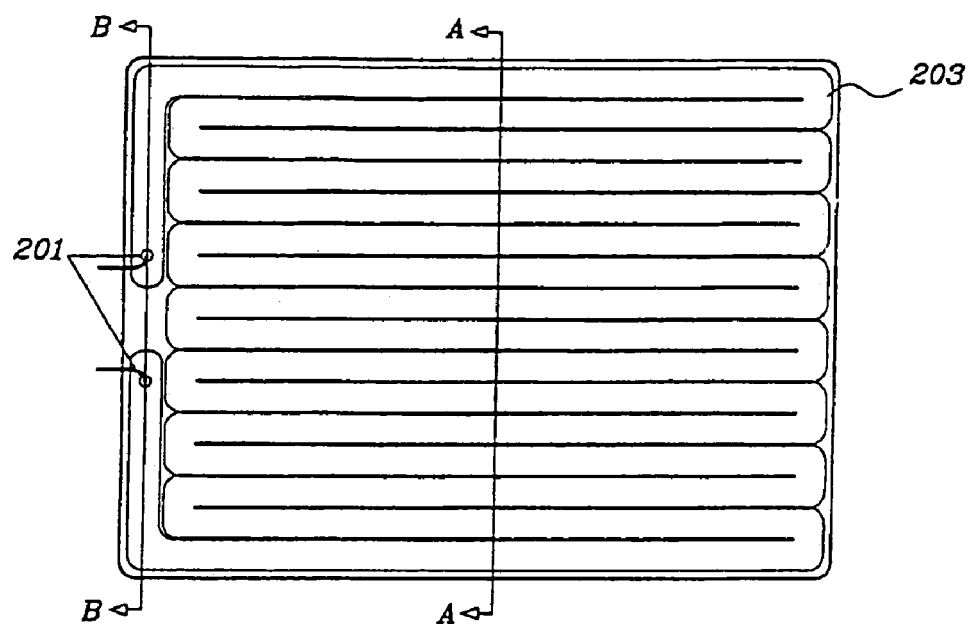
FIG. 12 is a plan view of a conventional surface emission fluorescent lamp.
Figure 13:
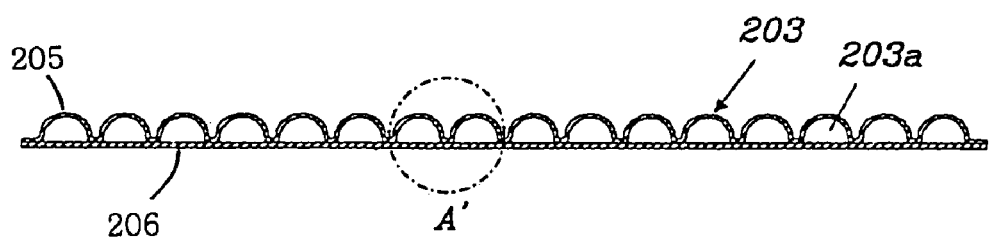
FIG. 13 is a sectional view by A—A line of FIG. 12.
Figure 16:
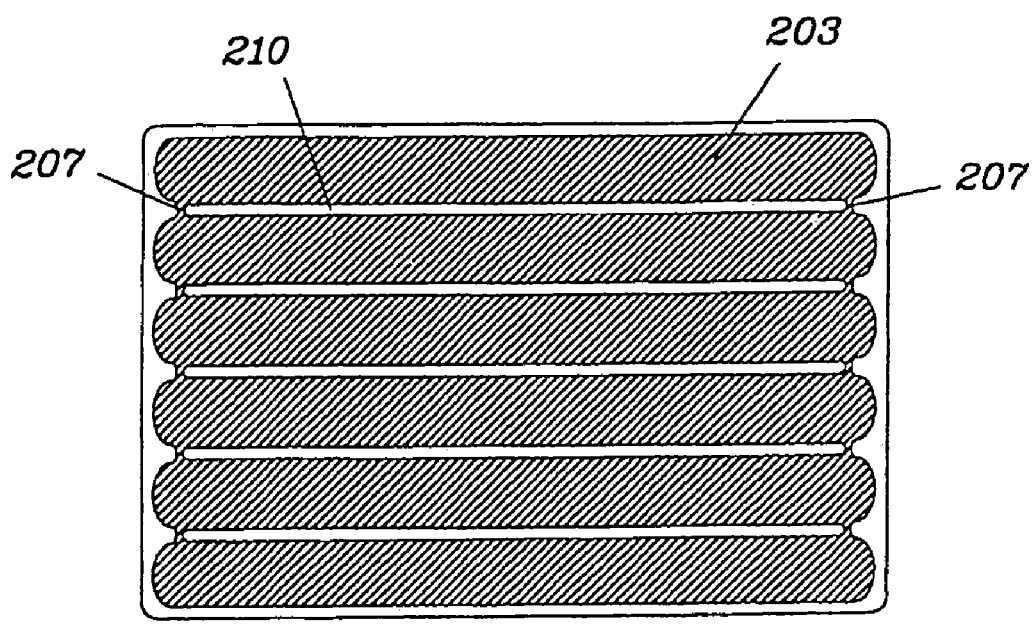
FIG. 16 is a plan view of another external electrode surface emission fluorescent lamp according to another preferred embodiment of the present invention.

FIG. 16 shows a modified embodiment in which gas paths 207 are formed between adjacent channels 203b of the external electrode surface emission fluorescent lamp 203 of the present invention. This embodiment shows that mutual horizontal channels are connected through the gas paths 207, compared with the embodiment of FIG. 15 in which respective bent portions of the external electrode surface emission fluorescent lamp 203 are connected to each other to form a single channel. Such a construction is advantageous in that it can uniformly distribute discharge gas into the surface emission fluorescent lamp 203 at a velocity higher than a moving velocity of discharge gas in the single channel construction shown in FIG. 12. Although it is depicted in FIG. 16 that one gas path 207 is formed in both ends of each of horizontal channels, the thickness, installation position and the number of the gas paths 207 can be varied. Obviously, it is clear that these modifications or variations are included in the scope of the present invention. A distribution speed of gas can be optimized by varying the thickness, installation position and the number of the gas paths 207 according to the length or thickness of the surface emission fluorescent lamp 203.

Figure 17:
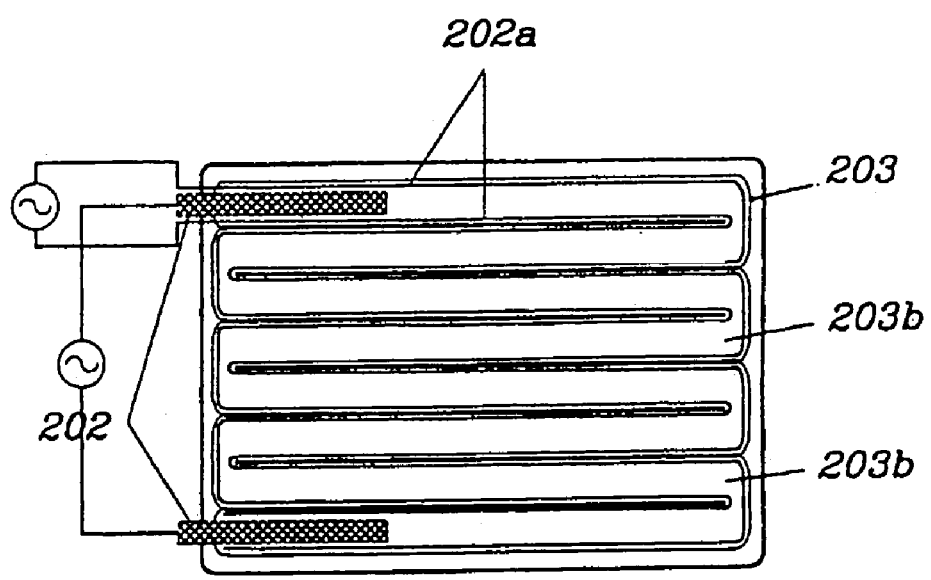
FIG. 17 is a view showing the installation of auxiliary electrodes of the external electrode fluorescent lamp of the present invention.
Figure 18:
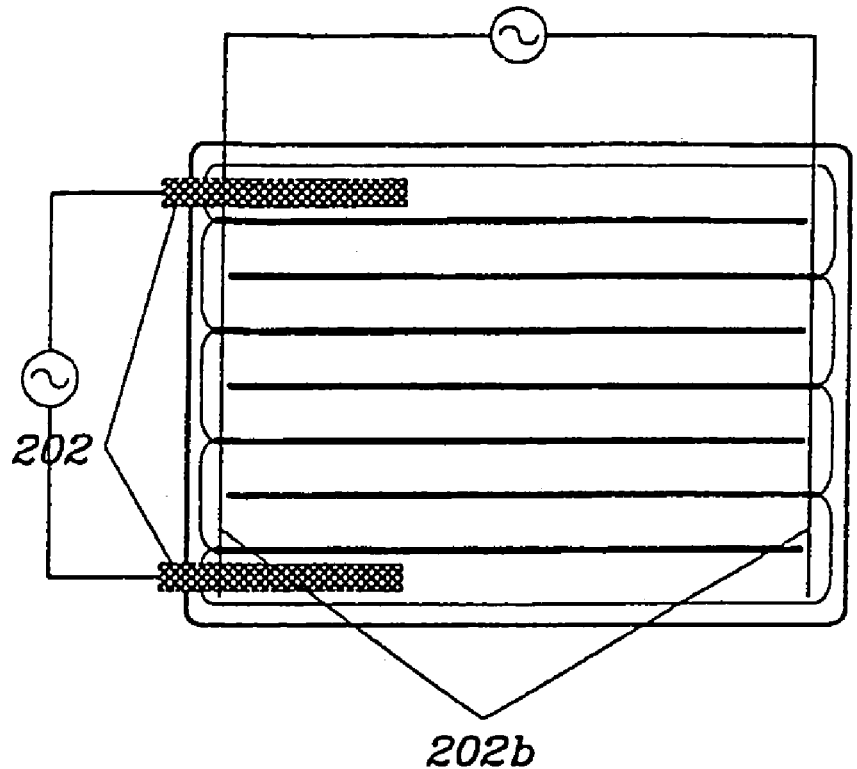
FIG. 18 is a view showing another installation of auxiliary electrodes of the external electrode fluorescent lamp of the present invention.

FIGS. 17 and 18 show the installation of auxiliary electrodes for driving the external electrode fluorescent lamp of the present invention at a low voltage. The external electrode surface emission fluorescent lamp 203 is long, so a high voltage is required to discharge it. Therefore, it is preferable to employ the auxiliary electrodes.

That is, if a voltage is applied to auxiliary electrodes connected to additional power, charged particles are generated within the fluorescent lamp 203. Thereafter, if a voltage is applied to the external electrodes 202 used as main electrodes, the surface emission fluorescent lamp 203 starts discharging even at a low voltage. Therefore, if the auxiliary electrodes are used, power consumption can be greatly reduced compared with an external electrode surface emission fluorescent lamp using only main electrodes. The auxiliary electrodes are installed on the surface of the surface emission fluorescent lamp 203 in the same manner as that of the external electrodes 202. In this case, the auxiliary electrodes can be installed in the shape of a line, without occupying a wide area.

FIG. 17 shows that auxiliary electrodes 202a are formed to enclose each of the channels 203b. On the other hand, FIG. 18 shows that auxiliary electrodes 202b are formed to pass along both ends of each of channels 203b. The installation position of the auxiliary electrodes can be varied in consideration of the length, area, etc. of the external electrode surface emission fluorescent lamp 203. That is, if it is required to shorten a response time of the surface emission fluorescent lamp 203, auxiliary electrodes are installed on the same positions as those of the auxiliary electrodes 202a of FIG. 17, while if it is permitted to delay a response time to some degree, they are installed on the same positions as those of the auxiliary electrodes 202b of FIG. 18. In this case, it is preferable that the auxiliary electrodes use a different power source from that of the external electrodes.

Further, in the surface emission fluorescent lamp 203 of the present invention, an upper sheet 205 and a lower sheet 206 can be manufactured to be integrated, or separately manufactured and fused later. The former case is disadvantageous in that it is difficult to apply fluorescent materials; while it is advantageous in that it simplifies a manufacturing process because it does not execute a sealing process. On the contrary, the latter case is disadvantageous in that it requires a sealing process for junction portions, while it is advantageous in that the application of fluorescent materials can be easily performed.

The surface emission fluorescent lamp 203 further has a getter inserted thereinto. The getter 208 is used to supply mercury into the channels 203b of the surface emission fluorescent lamp 203 and absorb several impurities existing in the channels 203b. The getter 208 is fixed by a getter housing such that it cannot move in the channels 203b.

Figure 19:
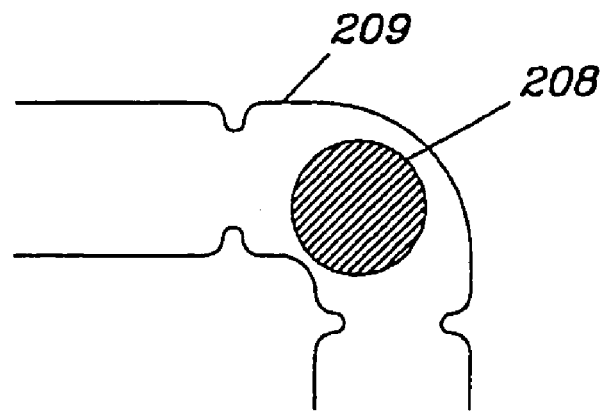
FIG. 19 is a sectional perspective view of a part "B" of FIG. 15 for showing the installation of a getter.
Figure 20:
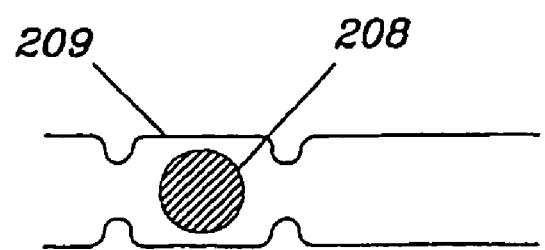
FIG. 20 is a sectional perspective view showing another installation of the getter.

FIGS. 19 and 20 shows embodiments of the getter housing 209. The embodiment of FIG. 19 can be applied to a case where the getter housing 209 is installed in a bent portion, that is, a bent portion B' of each of channels indicated in FIG. 15. The getter housing 209 of FIG. 19 has a portion exposed to the outside in the shape of a quarter of a circle, and has a center portion dented inwardly on the inner surface of the getter housing 209 to fix the getter 208. Further, the getter housing 209 can be constructed such that dented portions are formed on both the inner and outer surfaces of the getter housing 209.

On the other hand, FIG. 20 shows that a getter housing is formed in a portion of a bar-shaped channel, in which both ends of a channel are inwardly dented. It is clear that the fixing position of the getter 208 can be formed in any places within a range without preventing light radiation of the surface emission fluorescent lamp 203.

Figure 21:
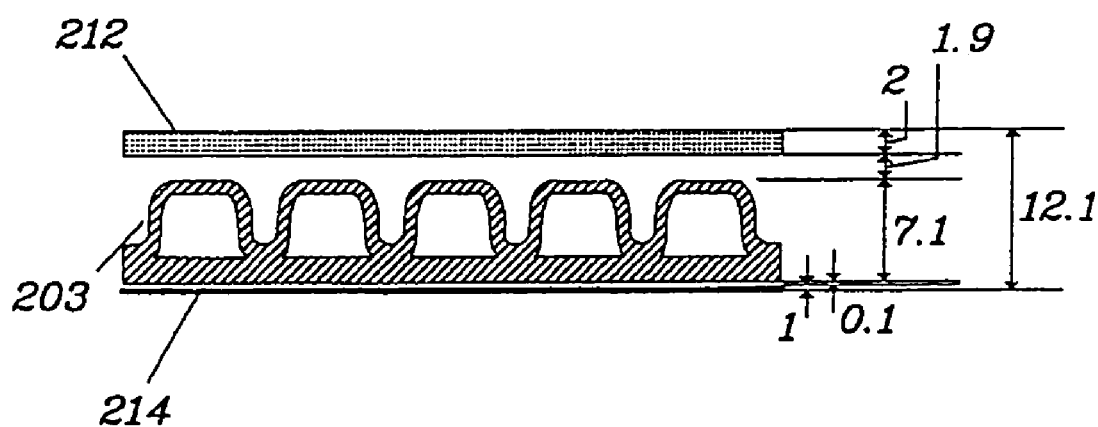
FIG. 21 is a side sectional view of a backlight unit according to the present invention.

An embodiment of a backlight unit using the surface emission fluorescent lamp 203 of the present invention having the above construction is shown in FIG. 21.

As shown in FIG. 21, a diffusion sheet 212 is arranged on the upper portion of the backlight unit, a reflective sheet 214 is arranged on the lower portion thereof, and the surface emission fluorescent lamp 203 is inserted therebetween. Even though not shown in detail, the diffusion sheet 212, the reflective sheet 214 and the surface emission fluorescent lamp 203 are fixed to a frame of the backlight unit. External electrodes 202 are also attached to the surface emission fluorescent lamp 203, as shown in FIG. 17, such that power is supplied from the outside.

Numerical values indicated in the left side of FIG. 21 are values of an optimized manufacturing embodiment of a backlight unit having a size equal to or greater than 15.1" and having brightness uniformity of 90%. The thickness of the diffusion sheet 212 is 2 mm, the thickness of the surface emission fluorescent lamp 203 is 7.1 mm, the thickness of the reflective sheet 214 is 1 mm, a spaced distance between the diffusion sheet 212 and the surface emission fluorescent lamp 203 is 1.9 mm, and a spaced distance between the reflective sheet 214 and the surface emission fluorescent lamp 203 is 0.1 mm, so the backlight unit is produced to have an entire thickness of 12.1 mm. These numerical values are values optimized under the above conditions satisfying the size equal to or greater than 15.1" and the brightness uniformity equal to or greater than 90%. Further, a predetermined voltage is applied to the external electrodes 202 of the surface emission fluorescent lamp 203 using a power supply circuit (not shown), thus operating the backlight unit.

In the above backlight unit, even though only the external electrodes 202 are attached to the external electrode surface emission fluorescent lamp 203, the external electrode surface emission fluorescent lamp 203 may further comprise auxiliary electrodes 202a and 202b, and may be manufactured as an integrated type or a separated type. Moreover, it is clear that gas paths can be formed in the external electrode surface emission fluorescent lamp 203, as shown in FIG. 16, and the construction of the getter housing 209 containing the getter 208 therein can be applied to the backlight unit. These applications are included in the scope of the present invention.

A driving device usable for the above-described external electrode surface emission fluorescent lamp having main electrodes and auxiliary electrodes will be described later. An embodiment of the external electrode surface emission fluorescent lamp having main and auxiliary electrodes is shown in FIG. 22.

Figure 23:
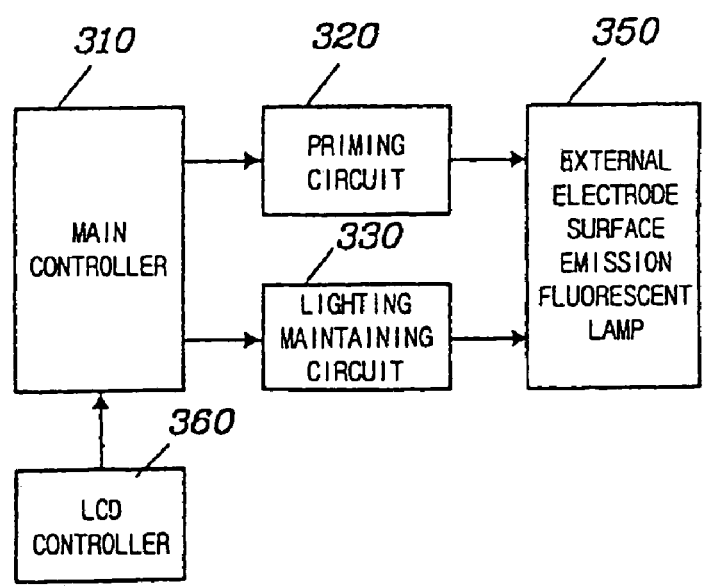
FIG. 23 is a block diagram of a device for driving a fluorescent lamp according to a preferred embodiment of the present invention.

FIG. 23 is a block diagram of a device for driving an external electrode surface emission fluorescent lamp according to an embodiment of the present invention. Referring to FIG. 23, the driving device comprises a main controller 310, a priming circuit 320, and a lighting maintaining circuit 330. The main controller 310 lights a surface emission fluorescent lamp 350 in response to a control signal outputted from an LCD controller 360 which is a higher control unit. The priming circuit 320 supplies power to auxiliary electrodes 305 so as to generate initial charged particles in the external electrode surface emission fluorescent lamp 350 in response to a control signal outputted from the main controller 310. The lighting maintaining circuit 330 supplies power to the main electrodes 303 so as to supply a lighting maintaining voltage using the charged particles generated by the priming circuit 320.

Figure 22:
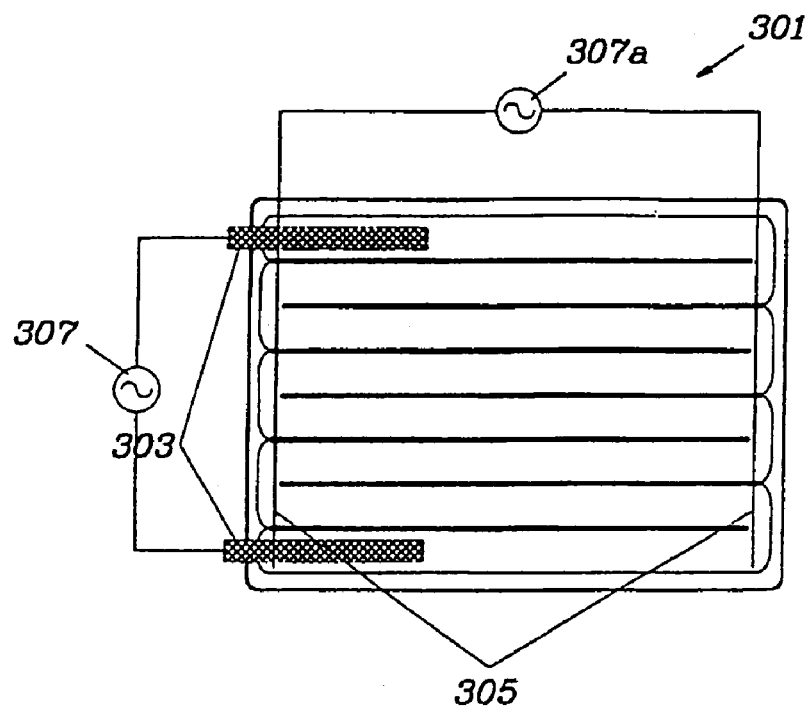
FIG. 22 is a plan view of a conventional surface emission fluorescent lamp having external electrodes.

The external electrode surface emission fluorescent lamp 350 is fundamentally the same as the surface emission fluorescent lamp 301 of FIG. 22. For convenience of description, the surface emission fluorescent lamp is designated by reference numeral 350 later. Further, it must be understood that external electrodes represent both the main electrodes 303 and the auxiliary electrodes 305, and are connected, as shown in FIG. 22.

The operations of the driving device having the above construction are described in detail.

If a driving signal for initiating the operation of the driving device is received from the LCD controller 360 which is a higher controller, the main controller 310 outputs the driving signal to the priming circuit 320, and turns off the priming circuit 320. In this case, before charged particles generated in the external electrode surface emission fluorescent lamp 350 disappear, the main controller 310 applies a driving signal to the lighting maintaining circuit 330 and drives the external electrode surface emission fluorescent lamp 350 using the generated charged particles. Such a lit condition is maintained until an OFF control signal is inputted to the main controller 310 from the LCD controller 360.

Figure 25:
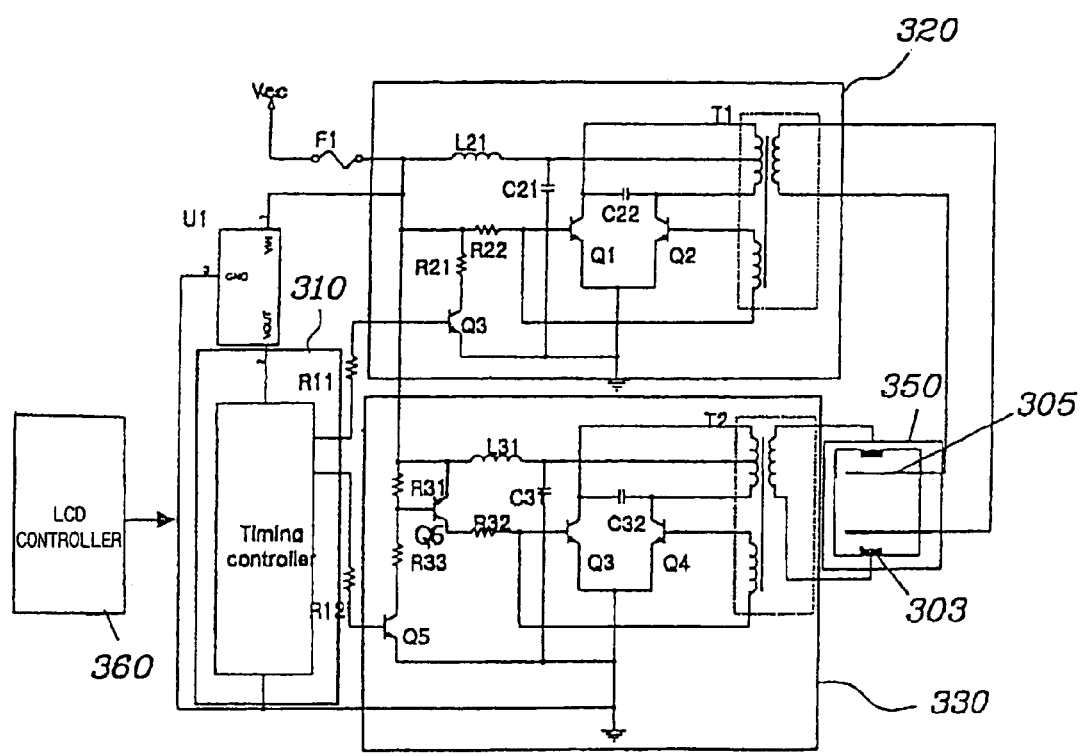
FIG. 25 is a detailed circuit diagram of the fluorescent lamp driving device of FIG. 23.

FIG. 25 is a detailed circuit diagram of the driving device of the present invention. The main controller 310 comprises a timing controller for supplying power, to the auxiliary electrodes 305 for a predetermined period of time in response to a control signal received from the LCD controller 360 to perform an initial lighting operation and thereafter supplying lighting power to the main electrodes 303. Further, the main controller 310 comprises a pair of resistors R11 and R12 connected in series with the priming circuit 320 and the lighting maintaining circuit 330, respectively, so as to apply driving signals to the priming circuit 320 and the lighting maintaining circuit 330.

Therefore, if a lighting signal is inputted from the LCD controller 360, the main controller 310 controls the timing to allow the priming circuit 320 to generate charged particles in the external electrode surface emission fluorescent lamp 350 using power supplied through the auxiliary electrodes 305 from the priming circuit 320. Thereafter, before the generated charged particles disappear, the lighting maintaining circuit 330 supplies power to the surface emission fluorescent lamp 350 through the main electrodes 303, thus operating the external electrode surface emission fluorescent lamp 350 at a low voltage. The predetermined period of time for driving the priming circuit 320 is determined by a lighting maintaining time of a fluorescent material required to generate sufficient number of charged particles in the surface emission fluorescent lamp 350.

Further, the priming circuit 320 is comprised of a transformer T1 for self-excited driving, a resonance capacitor C22, a pair of switching transistors Q1 and Q2, a transistor Q3 for receiving a signal from the main controller 310 to drive the switching transistors Q1 and Q2, resistors R21 and R22 for controlling a voltage and a current inputted to a gate, and a line filter consisting of a coil L21 and a capacitor C21 to stabilize an inputted current, thus enabling a voltage to be applied to the auxiliary electrodes 305 of the external electrode surface emission fluorescent lamp 350.

The lighting maintaining circuit 330 is used to receive a signal from the main controller 310 and apply a high voltage through the main electrodes 303 before charged particles formed in the external electrode surface emission fluorescent lamp 350 by the priming circuit 320 disappear. The lighting maintaining circuit 330 is comprised of a transformer T2 for self-excited driving, a resonance capacitor C32, a pair of switching transistors Q3 and Q4, transistors Q5 and Q6 for receiving a control signal from the main controller 310 to drive the switching transistors Q3 and Q4, resistors R31 and R32 for controlling a voltage and a current inputted to a gate, and a line filter consisting of a coil L31 and a capacitor C31 to stabilize an inputted current, thus enabling a voltage to be applied to the main electrodes 303 of the external electrode surface emission fluorescent lamp 350.

Figure 24:
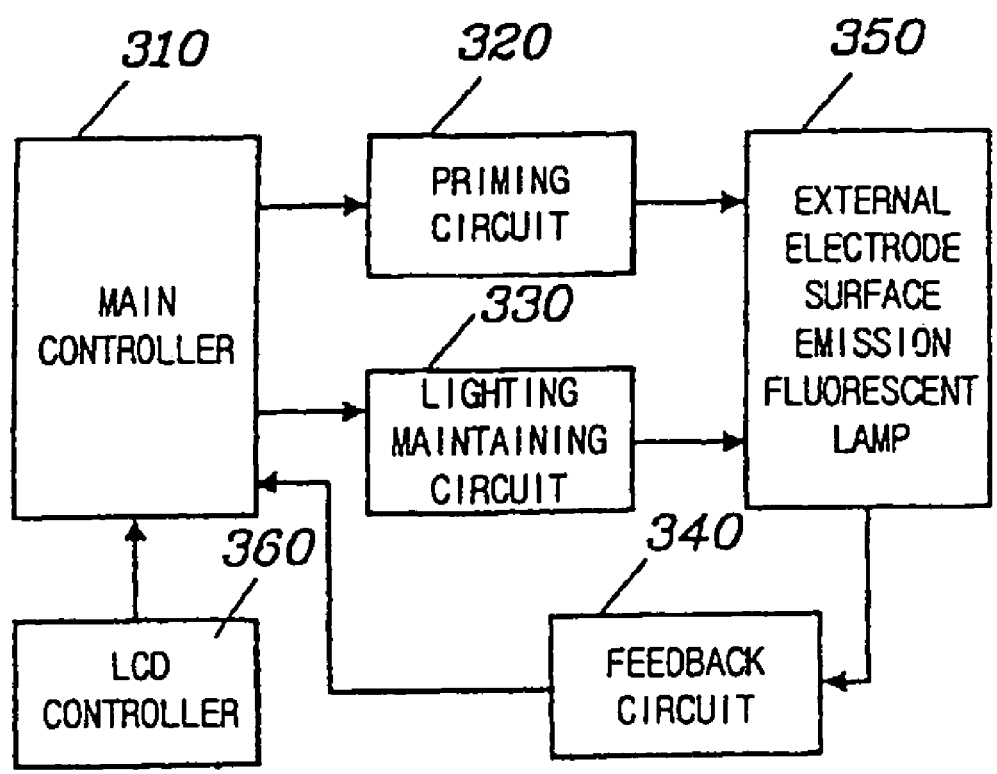
FIG. 24 is a block diagram of another device for driving a fluorescent lamp according to another preferred embodiment of the present invention.

Further, FIG. 24 is a block diagram showing another driving device further comprising a feedback circuit 340 according to another embodiment of the present invention. The driving device comprises a main controller 310, a priming circuit 320, a lighting maintaining circuit 330 and a feedback circuit 340. The main controller 310 lights a surface emission fluorescent lamp 350 in response to a control signal outputted from the LCD controller 360, and outputs a control signal to control the brightness of the external electrode surface emission fluorescent lamp 350 to correspond to brightness set by a user. The priming circuit 320 supplies power to the auxiliary electrodes 305 so as to generate initial charged particles in the external electrode surface emission fluorescent lamp 350 in response to the control signal outputted from the main controller 310. The lighting maintaining circuit 330 supplies power to the main electrodes 303 so as to apply a lighting maintaining voltage using the charged particles generated by the priming circuit 320. The feedback circuit 340 detects a current flowing into the external electrode surface emission fluorescent lamp 350, converts the current into a voltage, and applies the voltage to the main controller 310 so as to control the brightness of the lamp 350 through the lighting maintaining circuit 330. If the embodiment of FIG. 24 is compared with that of FIG. 23, the driving device further comprises the feedback circuit 340, and further has a function of controlling the brightness of the external electrode surface emission fluorescent lamp 350 by the main controller 310 using a feedback operation of the feedback circuit 340.

That is, if power is supplied through the lighting maintaining circuit 330, a current flowing into the external electrode surface emission fluorescent lamp 350 is detected by the feedback circuit 340, the detected current is converted into a voltage, and the, voltage is inputted to the main controller 310. Due to this voltage, the main controller 310 controls the brightness of the external electrode surface emission fluorescent lamp 350 by applying a PWM signal to the lighting maintaining circuit 330. A setting value for brightness control is inputted to the LCD controller 360 by the user, and then inputted to the main controller 310 of the driving device, together with the driving signal of the LCD controller 360.

Figure 26:
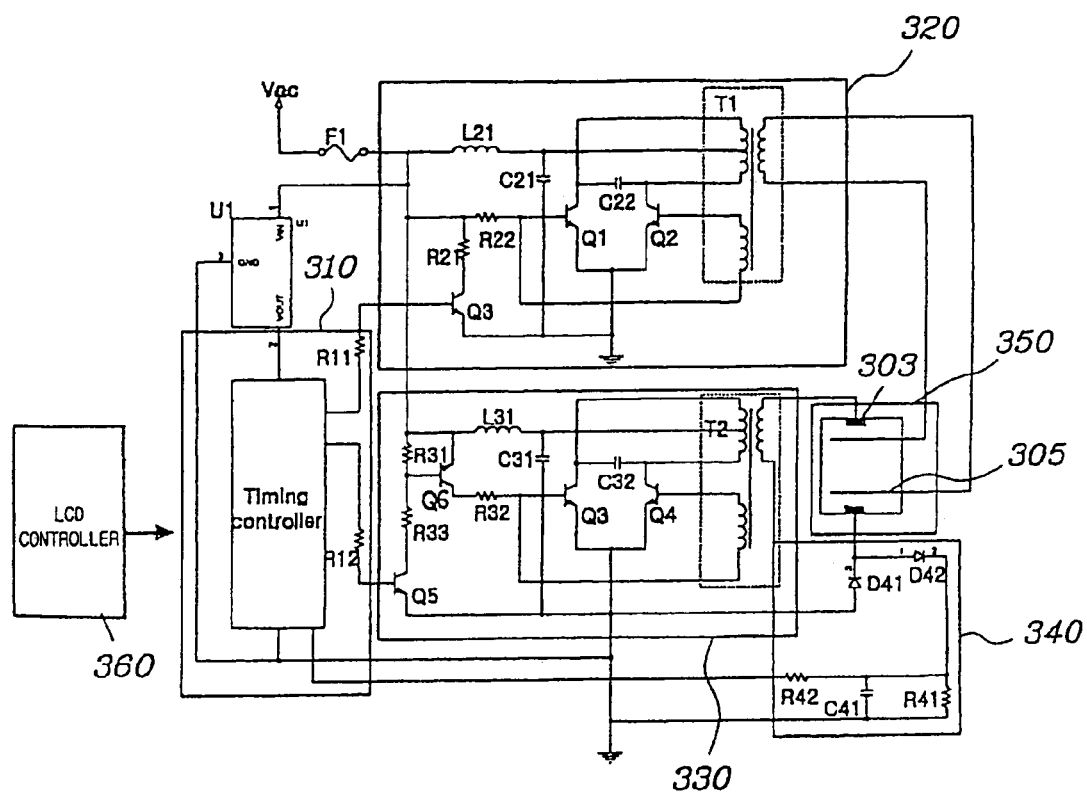
FIG. 26 is a detailed circuit diagram of the fluorescent lamp driving device of FIG. 24.

FIG. 26 is a detailed circuit diagram of the driving device of FIG. 24, wherein detailed descriptions are omitted because the circuit construction of FIG. 26 is similar to that of FIG. 25. The feedback circuit 340 is comprised of a rectifier consisting of a pair of diodes D41 and D42 to detect the current flowing into the external electrode surface emission fluorescent lamp 350, a resistor R41 for converting the detected current into a voltage, and a line filter consisting of a capacitor C41 and a resistor R42 to stably transmit the voltage inputted from the resistor R41 to the main controller 310.

Figure 27:
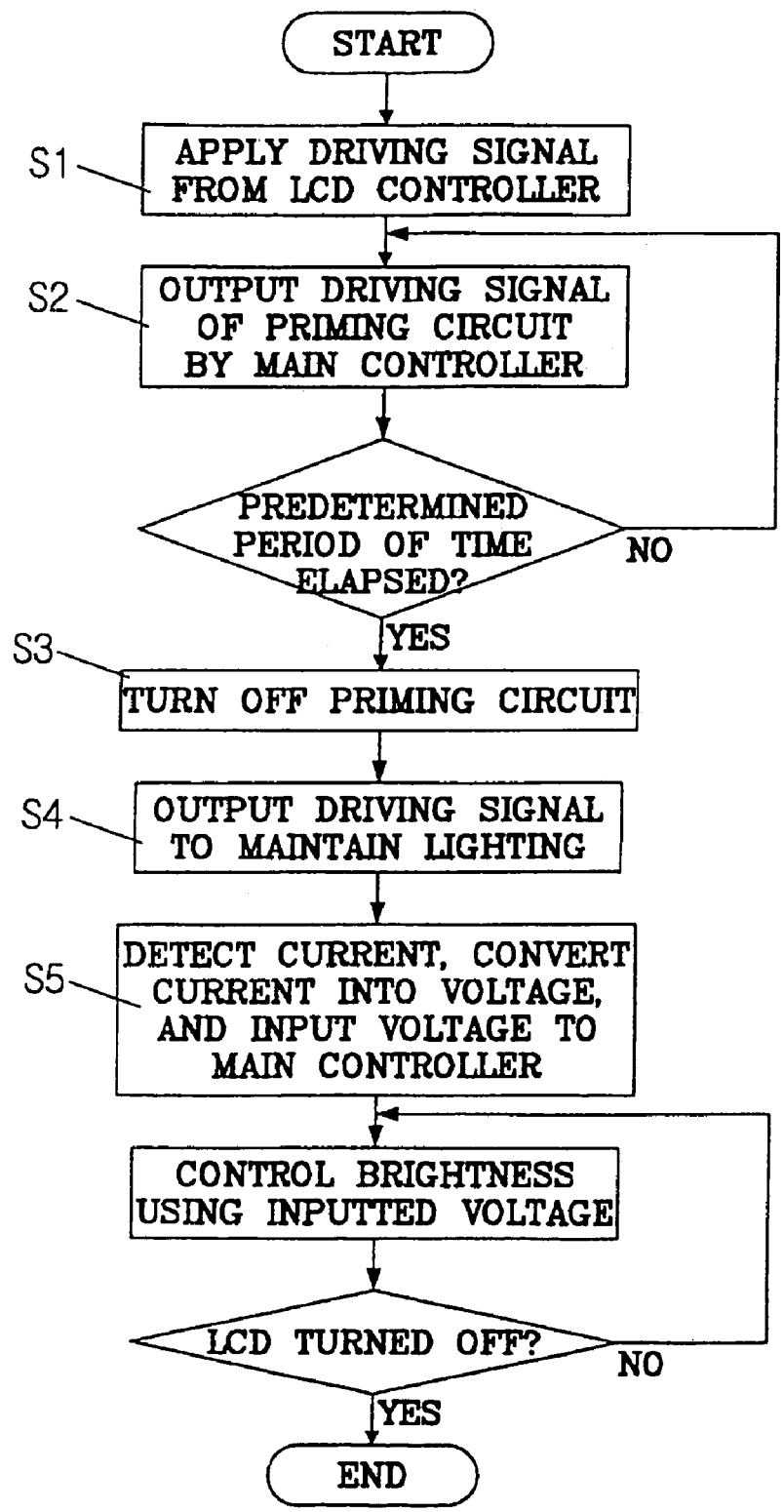
FIG. 27 is a flowchart showing the operation of a device for driving a surface emission fluorescent lamp of the present invention.

The operations of the device for driving the surface emission fluorescent lamp for LCDs of the present invention having the above construction are described with reference to a flowchart of FIG. 27 as follows.

First, if a user turns on a power lamp so as to operate a device on which an LCD panel is mounted, the LCD controller 360 applies a driving signal to the driving device at step S1. The driving signal from the LCD controller 360 is inputted to the main controller 310 of the driving device. If the driving signal is inputted, the main controller 310 outputs a driving signal to the priming circuit 320 at step S2. The priming circuit 320 is operated for a predetermined period of time set according to RC time constant. After the operation of the priming circuit 320 is finished at step S3, the main controller 310 outputs a driving signal to the lighting maintaining circuit 330 to light the external electrode surface emission fluorescent lamp 350 at step S4. That is, after power is supplied to the auxiliary electrodes 305 of the external electrode surface emission fluorescent lamp 350 to generate charged particles in the external electrode surface emission fluorescent lamp 350, power is supplied to the fluorescent lamp 350 through the main electrodes 303 using the lighting maintaining circuit 330 before the charged particles disappear. If the feedback circuit 340 is not further included in the driving device, the above operations are repeatedly performed.

As described above, if power is supplied by the lighting maintaining circuit 330, the external electrode surface emission fluorescent lamp 350 maintains its lit condition, thereby providing light sources to the LCD screen. Such a lighting maintaining operation is repeatedly performed until an OFF control signal is inputted from the LCD controller 360.

Further, if the feedback circuit 340 is further included in the driving device, as shown in FIG. 24, the main controller 310 controls the brightness by comparing a value set by the user with a measured value inputted by feedback using a voltage value inputted from the feedback circuit 340, and then outputting a voltage signal to the lighting maintaining circuit 330 in a PWM manner at step S5. Such a brightness control operation is repeatedly performed until the OFF control signal is inputted from the LCD controller 360.

INDUSTRIAL APPLICABILITY

As described above, the present invention is advantageous in that it can easily produce surface light sources with high brightness and high brightness uniformity compared with a conventional edge-type backlight unit or a direct-type backlight unit using cold cathode fluorescent lamps, reduce a calorific value of an LCD panel due to electrodes of the fluorescent lamp, prevent breakdown of lamps due to breakdown of electrodes, and extend the lives of fluorescent lamps.

Further, the present invention is advantageous in that electrodes of a surface emission fluorescent lamp used for LCD backlighting are constructed as external electrodes, thus simplifying a manufacturing process of surface emission fluorescent lamps, improving productivity thereof, easily producing a large-scale backlight unit, and enabling produced LCDs to be miniaturized and thinned.

Further, the present invention is advantageous in that an initial lighting voltage for generating charged particles is applied to the surface emission fluorescent lamp for LCDs having main electrodes and auxiliary electrodes, charged particles are generated, and a lighting maintaining voltage is applied to the surface emission fluorescent lamp before the generated charged particles disappear, thus maintaining the lit condition of the surface emission fluorescent lamp, stably operating the surface-emission fluorescent lamp even at a low voltage, and reducing continuous stress of a transformer and loss of switching devices due to a high voltage for initial lighting.

The invention claimed is:

1. An LCD backlight unit, comprising:
an inverter for generating first and second alternating current (AC) voltages using a direct current (DC) voltage and supplying the first and second AC voltages through first and second output lines, respectively;
a plurality of external electrode fluorescent lamps comprised of odd-numbered external electrode fluorescent lamps each having a first end electrode connected to the first output line of the inverter, and even-numbered external electrode fluorescent lamps each having a first end electrode connected to the second output line of the inverter, wherein second end electrodes of the odd-numbered and even-numbered external electrode fluorescent lamps, which are not connected to the first and second output lines, are grounded; and
a base for allowing the plural external electrode fluorescent lamps to be fixed,
wherein the inverter comprises:
a line filter for rectifying a DC voltage supplied through a DC power unit and outputting the rectified DC voltage;

a pulse generator for generating switching driving pulses;

a pair of driving buffers for selectively outputting the driving pulses generated by the pulse generator;

a pair of resonance circuits driven by the driving pulses outputted from the driving buffers to respectively converter the DC voltage received from the line filter into an AC voltage and output the AC voltage; and a pair of step-up transformers for respectively amplifying AC voltages outputted from the resonance circuits and outputting the amplified AC voltages to the external electrode fluorescent lamps which are divided into two groups, and wherein the base for allowing the external electrode fluorescent lamps to be fixed comprises:

a pair of isolating plates longitudinally extended and arranged opposite to each other; and a pair of lamp fixing plates having both ends connected to the isolating plates, and having a plurality of lamp fixing holes oppositely formed at regular intervals.

2. The LCD backlight unit according to claim 1, wherein the first and second output lines are arranged such that they alternately enclose the external electrode fluorescent lamps to intersect at sides of the external electrode fluorescent lamps, and to be opposite to each other at top and bottom portions thereof.

3. The LCD backlight unit according to claim 1, wherein the first and second AC voltages supplied through the first and second output lines from the inverter have the same phases and same frequencies.

4. The LCD backlight unit according to claim 1, wherein the inverter further comprises a feedback circuit for detecting secondary currents of the external electrode fluorescent lamps and applying a signal for brightness control to the pulse generator so as to control brightness of the external electrode fluorescent lamps.

* * * * *

UNITED STATES PATENT AND TRADEMARK OFFICE
CERTIFICATE OF CORRECTION

PATENT NO. : 7,084,583 B2  Page 1 of 1
APPLICATION NO. : 10/481110
DATED : August 1, 2006
INVENTOR(S) : Hur et al.

It is certified that error appears in the above-identified patent and that said Letters Patent is hereby corrected as shown below:

On the title page, Item (57) ABSTRACT, delete the existing ABSTRACT and replace it with the following text.

-- ABSTRACT

An external electrode fluorescent lamp includes an upper panel of lamp which is serpentine shaped, a lower panel which is planar shaped and to be combined with the upper panel to make channels between the upper panel and the lower panel; and external electrodes which are located at the two extreme sides of the surface of the upper panel. --

Column 17, Lines 5-6, Claim 1, "to respectively converter" should read
-- to respectively convert --

Signed and Sealed this

Second Day of January, 2007

JON W. DUDAS
*Director of the United States Patent and Trademark Office*